United States Patent Office 3,389,123
Patented June 18, 1968

1

3,389,123
COMPOSITIONS STABILIZED WITH
CYCLIC BORON COMPOUNDS
Robert D. Offenhauer, Pennington, N.J., assignor to Mobil
Oil Corporation, a corporation of New York
No Drawing. Continuation-in-part of application Ser. No.
502,424, Oct. 22, 1965. This application Sept. 30, 1966,
Ser. No. 583,472
26 Claims. (Cl. 252—49.6)

ABSTRACT OF THE DISCLOSURE

Organic compositions prone to oxidation are stabilized by the presence of a 5,12-dibora-6,13-dioxarodibenz(a,h) anthracenic compound. This compound may have substitution at the 5,12-positions and at the available nuclear carbon atoms.

---

The present application is a continuation-in-part of copending United States application Ser. No. 502,424, filed on Oct. 22, 1965, now abandoned.

This invention relates to compositions stabilized to reduce oxidative deterioration. More specifically, the invention has to do with novel compositions containing a material prone to oxidation and an agent capable of substantially inhibiting or minimizing the oxidative tendencies of said material.

As is well known, mineral oils and synthetic oils tend to oxidize in storage and in use, especially when subjected to heat and oxidizing conditions, such as are encountered in internal combustion engines. The oxidation products formed in the oil are acidic in nature and exert a corrosive action on the metal surfaces being lubricated. Oxidation is also indicated by an increase in viscosity of the oil, thereby materially changing the character of the oil.

Also, many polymeric or resinous materials are susceptible to oxidation in storage, processing or serving with one or more of such undesirable results as color change, softening, hardening by polymerization, unwanted or premature cross-linking, embrittlement or loss of flexibility, cracking, crazing, reduced tensile strength, or loss of electrical properties, etc. Such changes in character make the resinous compositions less saleable from an esthetic standpoint, particularly when they are used as surface coatings or for packaging, and less desirable for many other applications, as exemplified by insulating coverings on electrical conductors. Unfortunately, the oxidative deterioration of resinous compositions is generally increased at the elevated temperatures usually employed in manufacturing articles by extrusion, molding, casting, calendering, etc. of the plastic material and by high temperatures encountered in service.

Still other substances are susceptible to oxidation, including foodstuffs; glyceride oils and fats; soaps; waxes; cosmetics; essential oils and perfume bases.

The instant invention is directed to stabilizing liquid or solid materials prone to oxidation by incorporating therewith small amounts of unusually effective agents serving to decrease or eliminate the effects of oxidation on said materials and, in the case of at least some lubricants, to reduce the coefficients of friction and enhance the antiwear characteristics thereof.

2

More particularly, the present invention concerns oxidation-resistant compositions of matter which comprise a material prone to oxidation and a minor quantity sufficient to inhibit oxidation therein of a polynuclear heteroaromatic agent containing at least one structural unit of the type formula:

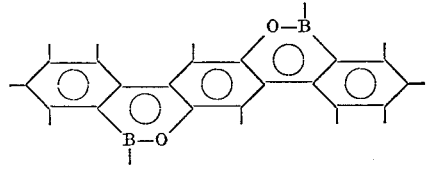

In the 6-membered rings set forth in the illustrative formulas in this specification and claims, a circle is enclosed in the rings to denote that these rings are either benzene rings or display substantial aromatic characteristics as in the case of the heteroaromatic rings. Also, dangling bonds or linkages are shown to denote the locations of rings or nuclear atoms at which either hydrogen or a substituent may be attached, and one or more of the designated nuclear atoms may have a substituent. These substituents may be the same or different radicals or atoms as described hereinafter.

Narrower aspects of the invention relate to compositions in which said heteroaromatic agents are incorporated in organic materials, especially when the latter are present in major proportion, and specific types thereof as exemplified by hydrocarbon lubricants of the nature of mineral oils of lubricating viscosity and polymeric materials of the nature of polyolefins (e.g., polypropylene), as well as to desirable classes and specific heteroaromatic compounds of the type indicated and proportions thereof.

Certain preferred heteroaromatic compounds are diethers of the aforementioned structure wherein an alkoxy or other hydrocarbyloxy radical (as defined hereinafter) is attached to each of the boron atoms. In the case of hydrocarbon lubricants, at least, the novel compositions display lower coefficients of friction and very substantial antiwear characteristics in use, on steel at least, when the heteroaromatic agent is present in extremely small concentration.

Lubricating oils contemplated herein may vary widely in origin and characteristics, and the selection of a suitable oil often depends upon the intended use. Naphthenic base, paraffin base, coastal base, and mixed base mineral oils are representative. Other hydrocarbon lubricants include lubricating oils derived from coal products, and alkylene polymers such as polymers of propylene, butylene, or the like, and mixtures thereof. Synthetic oils of other chemical types include alkylene oxide polymers, polysiloxanes (silicones), aromatic ethers, dicarboxylic acid esters, liquid esters of phosphorus, polypropylene glycol, di-(2-ethylhexyl) sebacate, di-(2-ethylhexyl) adipate, trimethylolpropane tricaprylate and related esters of pentaerythritol and neopentyl glycol. In general, the hydrocarbon oils and synthetic vehicles which can be used herein are characterized by a viscosity (SUS) of at least 25 seconds at 38° C. (100° F.), preferably from 60 to 6000 seconds at 38° C.

In the lubricant fields, the novel stabilized compositions with a suitable content of an appropriate oil may be employed as motor oils, cutting oils, roll oils, emulsion-type oils such as marine diesel oils, and also as greases.

Stabilized grease compositions may contain one or more of the aforementioned lubricating oils, the organoboron derivative and one or more thickening agents. A wide variety of thickening agents may be used in the greases, such as alkali and alkaline earth metal soaps of fatty acids and fatty materials having from about 12 to 30 carbon atoms per molecule. The metals are typified by sodium, lithium, calcium and barium. Fatty materials are illustrated by stearic acid, hydroxystearic acid, stearin, cottonseed oil acids, oleic acid, palmitic acid, myristic acid and hydrogenated fish oils. Other thickening agents include salt and salt-soap complexes as: calcium stearate-acetate (Patent No. 2,197,263); barium stearate-acetate (Patent No. 2,564,561); calcium stearate-caprylate-acetate complexes (Patent No. 2,999,065); calcium caprylate-acetate (Patent No. 2,999,066); and calcium salts and soaps of low-, intermediate- and high-molecular weight acids and of nut oil acids. Another group of thickening agents comprises substituted ureas, phthalocyanines, indanthrene, and pigments such as perylimides, pyromellitic diimides and ammeline. Still other thicking or gelling agents suitable for the new grease compositions are essentially hydrophobic clays which may be prepared from clays that are initially hydrophilic in character (e.g., bentonite, etc.) after conversion into a hydrophobic condition by the introduction of long chain hydrocarbon radicals into the surface of the clay particles, in known manner by a preliminary treatment with an organic cationic surface active agent, such as onium compounds.

Lubricant compositions described herein may also contain conventional additives which impart their customary beneficial characteristics as exemplified by corrosion inhibitors, extreme pressure agents, viscosity index agents, and fillers. Among such agents are colloidal silica, calcium acetate, calcium carbonate, molybdenum disulfides, etc.

The present invention is contemplated as encompassing a wide variety of oxidation-susceptible resinous or elastomeric compositions which are stabilized by the incorporation of small amounts of the aforesaid organoboron agents.

The invention is concerned with hydrocarbon polymers or copolymers, especially those obtained by the polymerization of a polymerizable composition containing an olefinic monomer. Preferably, the olefinic hydrocarbon is alpha-olefinic, i.e., a compound having the structure $CH_2=CR_2$, wherein each R is the same as or different from the other R and can be hydrogen or an alkyl, alkenyl, aryl, aralkyl, alkaryl or alicyclic group which preferably contains from one to eight carbon atoms. The polymers obtained therefrom include homopolymers such as polyolefins, e.g., polyethylene, polypropylene and poly-1-butene, and polyvinylbenzenes, e.g., polystyrene and poly-1-butene, and polyvinylbenzenes, e.g., polystyrene and poly-(alpha-methylstyrene), as well as copolymers such as those of a polyvinylbenzene (e.g., styrene) and an olefin (e.g., ethylene), different polyvinylbenzenes (e.g., styrene and alpha-methyl-styrene), and high-impact polystyrene prepared by copolymerizing rubbery material (e.g., natural or synthetic rubber) with styrene. Of the foregoing polymeric materials, homopolymers of lower ($C_2$ to $C_4$) olefins, particularly polypropylene, are of especial interest as major components of the stabilized compositions of this invention.

Another group of polymers and resins which may be used in accordance with this invention are the elastomeric compositions. These include various homopolymeric and copolymeric materials in normally solid form, natural rubber and various synthetic rubbers as illustrated by butadiene-styrene and butadiene-acrylonitrile polymerization products, including the GR-S and GR-N rubbers. Other elastomeric media are the butyl rubbers and the butadiene rubbers, including polyisobutylene, polybutadiene and polyisoprene (neoprene) rubbers, polyurethane elastomers, silicone rubbers, and polysulfide rubbers. Plasticized polyvinyl polymers are also suitable. These elastomers may be used in the form of foams. The additives of this invention provide not only thermal and oxidative stability to the elastomers, they are also useful as fillers, imparting structural strength and wear protection.

Other base materials prone to oxidation are contemplated as subject to improvement by incorporation therewith of heteroaromatic compounds of the type described herein. These include glyceride oils and fats; soaps; hydrocarbon and ester waxes; cosmetics; essential oils and perfume bases, and certain foodstuffs.

The stabilizing agents in the present compositions are a novel group of organoboron substances described in detail along with their preparation and claimed in my concurrently filed application, Ser. No. 502,625 entitled "Heteroaromatic Boron Compounds and Their Preparation," which application is incorporated herein by reference. These are polynuclear heteroaromatic compounds containing at least one 5,12-dibora-6,13-dioxaradibenz-(a,h)anthracene unit which may also be designated by structural units of the following type formula:

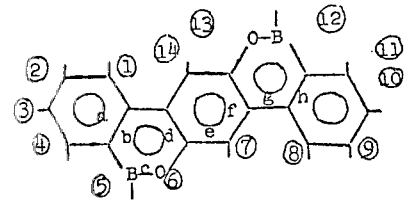

wherein numerals enclosed in small circles and lower case letters are included in the structural formula to illustrate the nomenclature employed herein for designating specific compounds of this class.

As mentioned earlier, the dangling bonds in the structural formulas indicate locations at which there is an option as to the atom or radical attached to the nuclear (ring) atom, and such extranuclear atoms or radicals may be the same or different entities. In the case of the nuclear carbon atoms, the substituents may be a hydrocarbyl, halogenated hydrocarbyl, or hydrocarbyloxy radicals; a nitro of cyano group, or a halogen atom. Either or both of the boron atoms may have a halogen atom or a hydroxyl, a hydrocarbyloxy, a halogenated hydrocarbyloxy, an aminoethoxy, an N-hydrocarbyl-aminoethoxy or an N,N-dihydrocarbyl-aminoethoxy group as a substituent. Preferred substituents on the boron atoms include hydroxy and hydrocarbyloxy radicals and chlorine atoms.

As used herein, the term "hydrocarbyl" is intended to mean a group composed of carbon and hydrogen atoms, such as an alkyl, alkenyl, aryl or alicyclic group or a structural combination of two or more of such groups, e.g., an alkaryl or aralkyl group. Thus, any of the dangling bonds in the preceding structural formulas may be attached to a hydrogen atom; an alkyl group (straight-chain or branched-chain) such as a methyl, ethyl, propyl, isopropyl, butyl, isobutyl, tert-butyl, octyl, dodecyl, hexadecyl, octadecyl, tetracosyl, triacontyl, etc. radical; an alkenyl group such as an ethenyl, propenyl, isopropenyl, etc. group; an aryl group such as a phenyl, naphthyl, etc. radical; an alkaryl group such as a methylphenyl, amylphenyl, etc. group; an alkaryl group such as a phenylmethyl, phenyloctyl, etc. group; an alicyclic group such as a cyclohexyl, cyclohexenyl, etc. group; an oxyhydrocarbyl group such as any of the aforementioned hydrocarbyl groups linked by a single bond to an oxygen atom, e.g., an alkoxy group such as a methoxy, ethoxy, etc. radical, or an aryloxy group such as a phenoxy, etc. group; a halogen such as chlorine, bromine or iodine; a nitro or cyano group; or a halogenated hydrocarbyl group, such as any of the aforementioned hydrocarbyl groups containing one or more halogen substituents therein. The boron atoms may also have still other substituents in the form of a hydroxyl group; a halogenated hydrocarbyloxy radical; or an aminoethoxy group having two hydrogen atoms, two of the aforementioned hydrocarbyl groups or one hydrogen atom and one of such hydrocarbyl groups attached to the nitrogen atom of the amino group. Among the hydrocarbyl and substituted hydrocarbyl radicals which are suitable substituents, those containing from 1 to about 30, and particularly from 1 to about 22 carbon atoms are especially preferred.

The new compounds may be prepared by reacting unsubstituted or certain substituted 2,5-diphenylhydroquinones with boron trichloride; followed by reacting the initial reaction product in the presence of (anhydrous) aluminum chloride to condense two heteroaromatic rings therein in forming the five-ring compound, 5,12-dichloro-5,12-dibora-6,13-dioxarodibenz(a,h) anthracene. Derivatives of said dichloro compound, such as the 5,12-dihydroxy and 5,12-dialkylethers, are readily obtained from the dichloro compound by hydrolysis with water and reaction with an aliphatic alcohol, respectively, in which the chlorine is split off as hydrogen chloride. The diether derivatives are soluble in liquid hydrocarbons and other organic solvents.

5,12 - dihydroxy - 5,12-dibora-6,13-dioxarodibenz(a,h) anthracene is in the monomeric form in aqueous solution but this difunctional monomer polymerizes readily upon heating to dryness apparently by the formation of oxygen bridges between boron atoms on two adjacent molecules of the monomer. The formation and polymerization of these organoboron derivatives are described in detail in my aforementioned concurrently filed application.

This polymeric derivative is of a refractory nature, and it chars without melting at estimated temperatures of 600–700° C. Also, it is insoluble in hydrocarbons and most or all of the common organic solvents in the absence of moisture. However, the polymeric material readily dissolves in water apparently by being hydrolyzed to the monomeric dihydroxy derivative and it appears that a similar effect occurs in at least some organic solvents (e.g., pyridine and tetrahydrofuran) in the presence of very small concentrations or traces of water.

The concentration of the heteroaromatic organoboron agent in the novel compositions is desirably at least sufficient to appreciably reduce the oxidative characteristics of the base material. There are indications that the minimum amount of this substance necessary for producing optimum stabilization against oxidation may be different for different base materials. Moreover, it is likely that good antiwear characteristics can be obtained in at least certain lubricants by concentrations of the organoboron agent which are less than those required for the optimum stabilization against oxidation. In general, the concentration of the heteroaromatic compound may range from about 0.01% to 5 or 10% or more based on the weight of the material being stabilized. In the case of polyolefins, a concentrtion of at least about 0.2% of the organoboron agent is advantageous but significantly improved lubricants may have considerabiy lower concentrations of the heteroaromatic substance. Usually there seems to be no advantage in having a concentration of more than about 5% of the oxidation inhibiting agent.

The novel compositions may be prepared by simple mixing techniques already known in the arts. For example, the solid heteroaromatic compounds may be dissolved in a liquid hydrocarbon oil or other lubricant or they may be incorporated into a granulated, pelleted or powdered resinous composition by addition in finely divided, or powder, form to the base material in a conventional mixing or kneading apparatus. In cases where the heteroaromatic substance is insoluble in a liquid base material, suitable dispersing or emulsifying agents may be utilized in obtaining a stable mixture or suspension. Such dispersing agents should of course be compatible with both the base material and the organoboron agent.

While it is usually preferable to utilize a heteroaromatic compound in monomeric form, it is also contemplated that polymers may also be employed in certain instances inasmuch as the polymeric material is readily subject to hydrolysis in the presence of moisture, even in trace amounts, which converts the polymer heteroaromatic material into the corresponding dihydroxy monomer having a hydroxyl group attached to each boron atom. It is possible that this may result in a gradual and prolonged release of the active antioxidant substance which may be desirable in certain applications.

For a better understanding of the nature and objects of this invention, reference should be had to the following illustrative examples in which all proportions are expressed in terms of weight and all temperatures as degrees centigrade unless otherwise stated.

Example 1

A quantity of white mineral oil (kinematic viscosity at 210° F. of 8 centipoises) amounting to 1000 parts is used to dissolve 2.01 parts (0.0051 mol per kilogram) of crystals of 5,12 - di-n-butoxy-5,12-dibora-6,13-dioxarodibenz (a,h)anthracene by simple stirring at a temperature of 150° C.

The resulting composition and a control sample of the same unmodified mineral oil are subjected to a noncatalytic oxidation test in an oxygen circulation apparatus of the type described by Dornte (Ind. Eng. Chem.; 28, 26–30, 1936) modified so that the rate of oxygen adsorption can be recorded automatically. A tube containing the oil sample is heated to 150° C. and maintained at that temperature during the test. Oxygen is circulated from a closed oxygen circulating system through a fritted glass disc near the bottom of the sample tube at a rate of 5 liters per hour and the time required for the adsorption of 0.5 mol of oxygen per kilogram of sample is recorded as the induction period. The longer the induction period, the greater is the oxidative resistance of the oil sample.

The induction period of the sample containing the organoboron compound is found to be approximately 223 hours whereas the control sample has an induction period of only 1 hour.

Example 2

One part of 5,12-di-n-hexadecoxy - 5,12 - dibora-dioxarodibenz(a,h)anthracene is dissolved in 1000 parts of cetane by stirring at a temperature of about 93° C. in preparing a material designated as Sample A. Both this composition and unmodified cetane are then subjected to an arbitrary wear test in a pin-on-disc machine. In this device, the smooth hemispherical end of a stationary steel pin of 0.25 inch diameter bears on a rotating steel disc submerged in the lubricant being tested. Both pin and disc are constructed of the same designated type of steel and the lubricant baths are maintained at a temperature of 93.3° C. under atmospheric pressure. A load of 8 kilograms is applied to the pin and the disc is driven at a constant speed which provides a sliding linear velocity of 10.0 cm./sec. across the end of the pin. Only the volume of metal worn off the end of the pin is measured in determining the wear rate in cubic centimeters of steel per centimeter of travel of the disc across the bearing end of the pin. The coefficients of friction are also determined with suitable auxiliary equipment. Two different grades of steel are employed in the tests tabulated hereinafter.

| Lubricant | Steel | Coefficient of Friction | Wear Rate, cc./cm. |
| --- | --- | --- | --- |
| Control | AISI 1020 | *1.2 | $250,000 \times 10^{-11}$ |
| Sample A | AISI 1020 | 0.17 | $11.2 \times 10^{-11}$ |
| Control | AISI 4140 | 1.0 | $5,000 \times 10^{-11}$ |
| Sample A | AISI 4140 | 0.20 | $1.3 \times 10^{-11}$ |

*Approximate value.

It is apparent that the oil containing the organoboron compound both markedly reduces friction and displays a strikingly great reduction in the wear rate on the two grades of steel in comparison with the unmodified oil.

Example 3

Finely divided 5,12-di-n-hexadecoxy - 5,12 - dibora-6,13-dioxarodibenz(a,h)anthracene is mixed with batches of powdery inhibitor-free polypropylene (Hercules Powder Co. resin H–6501) in quantities ranging from 0.25% to 1% of the organoboron compound based on the resin.

The oxidation resistances of the aforesaid resin compositions are determined in comparison with an unmodified sample of the same resin by dividing a 20 gram portion of each sample among three clean flat-bottom aluminum foil dishes of 7 cm. diameter followed by heating the samples for 2 hours at 185° C. in an oven having forced air circulation and then cooling the samples to room temperature. These samples are then cut into strips for use in determination of the melt index according to ASTM Test Method D–1238 at 230° C. using a weight of 1200 grams on the rod. Similar melt index determinations are run on samples of the same resin mixtures which are not subjected to the oven heating test as well as on a control sample of the unmodified resin.

Melt index, as measured by ASTM Method D–1238, provides a measure of the flow rate of a thermoplastic through the orifice of an extrusion plastometer under specified conditions of temperature and pressure. Comparison of such flow rates of a sample before and after exposure to oxidation conditions provides a reliable measure of the degree of oxidative degradation caused by the exposure, with a higher flow rate indicating a higher degree of oxidative degradation. Thus, the smaller the increase in melt index of a sample during exposure to oxidation conditions, the greater the oxidation resistance of the sample.

The results of the aforesaid tests are as follows:

| Additive in Sample | Melt Index | | |
|---|---|---|---|
|  | Initial | Final | Increase |
| None (control) | 1.5 | >25 | >23.5 |
| 0.25% | 1.5 | 2.93 | 1.43 |
| 0.50% | 1.5 | 2.83 | 1.33 |
| 1.00% | 1.4 | 1.98 | 0.58 |

These results demonstrate that the oxidation resistance of the novel resin compositions is greatly superior to that of unmodified polypropylene.

Example 4

Into 100 parts of a typical GR–S butadiene-styrene rubber is milled 1 part of 5,12-di-n-butoxy-5,12-dibora-6,13-dioxarodibenz(a,h)anthracene. A uniformly mixed rubber of improved thermal and oxidation stability is obtained.

Example 5

Into 100 parts of a polyisobutylene rubber is milled 1 part of finely divided 5,12-di-n-hexadecoxy-5,12-dibora-6,13-di-oxarodibenz(a,h)anthracene. After the milling step is completed, the resulting uniform mixture is a rubber having improved thermal and oxidation stability.

Example 6

Into 100 parts of a silicone rubber is milled 20 parts of finely divided 5,12-dihydroxy-5,12-dibora - 6,13 - dioxarodibenz(a,h)anthracene. The resulting mixture is a rubber having as a filler a condensation polymer of 5,12-dihydroxy-5,12-dibora - 6,13 - dioxarodibenz(a,h)anthracene and having exceptional thermal and oxidative stability and antiwear properties.

A few illustrative embodiments of the composition of the instant invention have been described in specific detail in the foregoing illustrative examples; however, it will be readily apparent to those skilled in the art that numerous variations and modifications fall within the purview of this invention. Accordingly, the present invention should not be regarded as limited in any particulars except as may be recited in the appended claims or required by the prior art.

I claim:
1. A composition of matter which comprises an organic material prone to oxidation and a minor quantity sufficient to inhibit oxidation therein of a polynuclear heteroaromatic agent containing at least one 5,12-dibora-6,13-dioxarodibenz(a,h)anthracenic structural unit of the type formula:

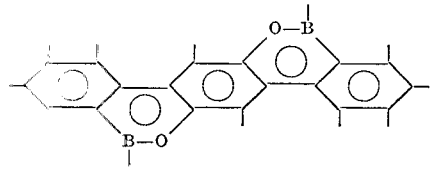

wherein attached to the boron atoms and to the nuclear carbon atoms having dangling valences is a member selected from the group consisting of hydrogen; halogen; alkyl, alkenyl, aralkyl, aryl, alkaryl, alicyclic, alkoxy, aryloxy, and halo-derivatives thereof, said organic radicals having from 1 to about 30 carbon atoms; cyano and nitro.

2. A composition according to claim 1 in which the quantity of said heteroaromatic agent amounts to at least about 0.01 percent by weight of said material.

3. A composition according to claim 1 in which said material is a hydrocarbon lubricant.

4. A composition according to claim 1 in which said material is a polymeric material.

5. A composition according to claim 1 in which said material is a polyolefin.

6. A composition of matter which comprises an organic material prone to oxidation and a minor quantity sufficient to inhibit oxidation therein of a polynuclear heteroaromatic compound having the structural formula shown in claim 1 in which the boron atoms are attached to hydrocarbyloxy groups.

7. A composition according to claim 6 in which the quantity of said heteroaromatic compound amounts to at least about 0.01 percent by weight of said organic material.

8. A composition according to claim 6 in which said organic material is a hydrocarbon lubricant.

9. A lubricant according to claim 6 in which said organic material is a mineral oil of lubricating viscosity.

10. A composition according to claim 6 in which said organic material is a polymeric material.

11. A composition according to claim 6 in which said organic material is a polyolefin.

12. A composition of matter which comprises a major proportion of a hydrocarbon material prone to oxidation and a minor quantity sufficient to inhibit oxidation therein of a polynuclear heteroaromatic compound having the structural formula shown in claim 1 in which the boron atoms are attached to alkoxy groups containing from 1 to 22 carbon atoms in the alkyl portion.

13. A composition according to claim 12 in which the quantity of said heteroaromatic compound amounts to between about 0.01 and 5 percent by weight of said hydrocarbon material.

14. A composition according to claim 13 in which said hydrocarbon material is a hydrocarbon lubricant.

15. A lubricant according to claim 13 in which said hydrocarbon material is a mineral oil of lubricating viscosity.

16. A composition according to claim 13 in which said hydrocarbon material is a polymeric material.

17. A composition according to claim 13 in which said hydrocarbon material is a polyolefin.

18. A composition of matter according to claim 15 in which there is contained a major proportion of a mineral oil of lubricating viscosity and a quantity of 5,12-di-n-butoxy - 5,12-dibora-6,13-dioxarodibenz(a,h)anthracene.

19. A composition of matter according to claim 15 in which there is contained a major proportion of a mineral oil of lubricating viscosity and a quantity of 5,12-di-n-hexadecoxy - 5,12 - dibora - 6,13-dioxarodibenz(a,h) anthracene.

20. A composition of matter according to claim 17, in which there is contained a major proportion of polypropylene and a quantity of 5,12-di-n-hexadecoxy-5,12-dibora-6,13-dioxarodibenz(a,h)anthracene.

21. A composition according to claim 4 in which the material prone to oxidation is an elastomer.

22. A composition according to claim 21 in which the elastomer is selected from the group consisting of natural and synthetic rubbers.

23. A composition according to claim 21 in which the elastomer is selected from the group consisting of natural rubber, a styrene-butadiene rubber, a styrene-acrylonitrile rubber, polybutadiene rubbers, neoprene rubbers, polyisobutylene rubbers, polysilicone rubbers, and polysulfide rubbers.

24. A composition according to claim 21 in which the elastomer is a styrene-butadiene rubber.

25. A composition according to claim 21 in which the elastomer is a polyisobutylene rubber.

26. A composition according to claim 21 in which the elastomer is a polysilicone rubber.

References Cited
UNITED STATES PATENTS

| | | | |
|---|---|---|---|
| 2,962,446 | 11/1960 | Cook | 252—78 |
| 3,131,164 | 4/1964 | Doyle | 260—45.8 |
| 3,193,521 | 7/1965 | Jasching | 260—45.8 X |
| 3,287,270 | 11/1966 | McCabe et al. | 252—49.6 |

DANIEL E. WYMAN, *Primary Examiner.*

W. H. CANNON, *Assistant Examiner.*